US012711601B2

(12) United States Patent
Souma

(10) Patent No.: US 12,711,601 B2
(45) Date of Patent: Aug. 18, 2026

(54) SYSTEM AND METHOD FOR GENERATING TRAINING IMAGE DATA FOR SUPERVISED MACHINE LEARNING, AND NON-TRANSITORY RECORDING MEDIUM

(71) Applicant: Konica Minolta, Inc., Tokyo (JP)

(72) Inventor: Yoshihito Souma, Sakai (JP)

(73) Assignee: KONICA MINOLTA, INC., Tokyo (JP)

( * ) Notice: Subject to any disclaimer, the term of this patent is extended or adjusted under 35 U.S.C. 154(b) by 328 days.

(21) Appl. No.: 18/361,054

(22) Filed: Jul. 28, 2023

(65) Prior Publication Data

US 2024/0037728 A1 Feb. 1, 2024

(30) Foreign Application Priority Data

Jul. 29, 2022 (JP) ................................ 2022-121443

(51) Int. Cl.
*G06T 7/00* (2017.01)
*G06T 15/06* (2011.01)
(Continued)

(52) U.S. Cl.
CPC ............ *G06T 7/0008* (2013.01); *G06T 15/06* (2013.01); *G06T 15/50* (2013.01); *G06V 10/60* (2022.01); *G06V 10/774* (2022.01); *G06V 20/70* (2022.01)

(58) Field of Classification Search
None
See application file for complete search history.

(56) References Cited

U.S. PATENT DOCUMENTS

2018/0012350 A1* 1/2018 Gangitano ......... G01N 21/8806
2018/0060702 A1* 3/2018 Ma ...................... G06V 10/764
(Continued)

FOREIGN PATENT DOCUMENTS

JP 2019215240 A 12/2019
JP 2021039022 A 3/2021
(Continued)

OTHER PUBLICATIONS

Lahiri, Avijit. (2016). Basic Optics—Principles and Concepts—5. Diffraction and Scattering. Elsevier. Retrieved from https://app.knovel.com/hotlink/pdf/id:kt0112YY96/basic-optics-principles/diffraction-scattering (Year: 2016).*
(Continued)

*Primary Examiner* — Amandeep Saini
*Assistant Examiner* — Caroline Tabancay Duffy
(74) *Attorney, Agent, or Firm* — CANTOR COLBURN LLP

(57) ABSTRACT

A system for generating training image data for supervised machine learning for training a defect classifier to be applied to visual inspection. The system arranges a defect model arbitrarily selected from a storage storing defect models obtained by modeling shapes and optical characteristics of defects and an inspection target surface model arbitrarily selected from a storage storing inspection target surface models obtained by modeling shapes and optical characteristics of inspection target surfaces, in any space in which ray tracing is performed by ray tracing simulation software in which an illumination optical system, an image pickup optical system, and an imaging sensor including a plurality of pixels are modeled. The system further traces a plurality of light rays, calculates illuminance at each of the pixels based on an intensity and a number of light rays entering the pixels, and generates pseudo image data as training image data based on the illuminance.

18 Claims, 6 Drawing Sheets

(51) Int. Cl.

| | |
|---|---|
| ***G06T 15/50*** | (2011.01) |
| ***G06V 10/60*** | (2022.01) |
| ***G06V 10/774*** | (2022.01) |
| ***G06V 20/70*** | (2022.01) |

(56) References Cited

U.S. PATENT DOCUMENTS

| | | | | |
|---|---|---|---|---|
| 2020/0211169 | A1* | 7/2020 | Tsutsumi | G01N 21/9501 |
| 2022/0207716 | A1* | 6/2022 | Johannesson | G06T 7/0008 |
| 2023/0169634 | A1* | 6/2023 | Hu | G06T 5/50<br>382/141 |
| 2024/0153066 | A1* | 5/2024 | Onozuka | G06T 7/0004 |

FOREIGN PATENT DOCUMENTS

| | | | | |
|---|---|---|---|---|
| JP | 2021043010 A | 3/2021 | | |
| WO | WO-2018225406 A1 * | 12/2018 | | G03B 15/00 |

OTHER PUBLICATIONS

The 27th Symposium on Sensing via Image Information, Japan, and an image sensing technique (Document showing well known arts). No English translation available. The English translation of the office action serves as a concise explanation of relevance to fulfill the requirement of the IDS.

JPO Notice of Reasons for Refusal for corresponding JP Application No. 2022-121443; Issued Oct. 29, 2024.

EPO Extended European Search Report for corresponding EP Application No. 23187483.5, Dated Jan. 8, 2024.

* cited by examiner

DOOR
HEIGHT (μm)
2
1
0
−1
−2
X
Y
41

ACCENT LINE
HEIGHT (μm)
0
−1
−2
−3
−4
X
Y
42

WHEEL HOUSE
HEIGHT (μm)
2
1
0
−1
−2
X
Y
43

10

DUST + DOOR

PINHOLE + WHEEL HOUSE

DROP + ACCENT LINE

SYSTEM AND METHOD FOR GENERATING TRAINING IMAGE DATA FOR SUPERVISED MACHINE LEARNING, AND NON-TRANSITORY RECORDING MEDIUM

CROSS-REFERENCE TO RELATED APPLICATION

The present invention claims priority under 35 U.S.C. § 119 to Japanese Patent Application No. 2022-121443 filed on Jul. 29, 2022, the entire contents of which being incorporated herein by reference.

BACKGROUND

1. Technological Field

The present invention relates to a system and a method for generating training image data for supervised machine learning, and a non-transitory recording medium, which generate training image data for training a defect classifier to be applied to classify the type of a surface defect in visual inspection of a workpiece.

2. Description of the Related Art

A so-called visual inspection apparatus, which uses a digital camera to capture an image of an inspection target surface of a workpiece illuminated by a controlled lighting section and processes the captured image to detect a surface defect, is used in various industrial fields. In recent years, there have been many demands for classifying the type of a defect from a captured image in order to analyze the cause of the defect or to provide information to a repair process. For this reason, development of a defect type classification function using supervised machine learning has been advanced.

Sufficient training data (labeled image) is collected for each defect type desired to be classified, and a classifier is generated by training a supervised machine learning algorithm. In the field of image classification, a deep learning method called a convolutional neural network (CNN) is widely used because of its superiority in performance.

In order to obtain desired defect classification performance using supervised machine learning, sufficient training data is required. In this regard, there are the following problems.

1. A person who has knowledge about a defect needs to give a correct label to a large amount of images, which requires a large amount of labor. Furthermore, different labels may be given to the same images depending on a person.
2. It takes time to collect image data for a defect that occurs at a low frequency.
3. Since an image changes when characteristics (e.g., shape and color) of an inspection target object differ, it is necessary to collect and learn images for respective characteristics of the inspection target object even for the same defect.
4. Since an image changes when an image capturing condition such as a lighting condition or a resolution of a captured image is different, it is necessary to collect and learn images for respective image capturing conditions even for the same defect.

Japanese Unexamined Patent Application Publication No. 2021-43010 discloses the following optical condition determination system for the purpose of obtaining an optimal optical condition to be applied to visual inspection. The optical condition determination system includes a simulation executor that generates a surface property image and a defect image by performing an optical simulation under a plurality of optical conditions for each of a surface property model obtained by modeling a surface property of an object to be visually inspected and a defect model obtained by modeling a defect of the object. The optical condition determination system further includes an image synthesizer that synthesizes the surface property image and the defect image generated by the optical simulation under the same optical conditions to generate a synthesized image, and an evaluation value calculator that calculates an evaluation value indicating how easily the defect is detected in the synthesized image. The optical condition determination system further includes a correlation analyzer that analyzes a correlation between the optical conditions corresponding to the synthesized image and the evaluation value, and an optimum condition searcher that searches for an optical condition suitable for the visual inspection based on a result of the analysis of the correlation.

Furthermore, WO2018/225406 discloses the following method for determining arrangement of a surface defect inspection apparatus. In this method, the arrangement position and the optical axis direction of each of a lighting unit and an image sensing unit are set as the first and second arrangement information. Based on information obtained by digitizing each of the lighting unit, the image sensing unit, and the appearance of an inspection target object including a defect, the inspection target object is illuminated by the lighting unit based on the first arrangement information, an image of an inspection region is captured by the image sensing unit based on the second arrangement information, and the image is obtained by numerical calculation. The defect is detected based on the image.

However, both of the techniques described in Japanese Unexamined Patent Application Publication No. 2021-043010 and WO2018/225406 are intended to obtain optical conditions optimal for visual inspection and are not techniques for generating training image data for training a supervised machine learning algorithm. Therefore, it is not possible to solve the problems related to the acquisition of training data as described above.

SUMMARY

An object of the present invention is to provide a system and a method for generating training image data for supervised machine learning, and a non-transitory recording medium that are able to easily generate appropriate training image data for performing defect classification using the supervised machine learning.

A first aspect of the present invention relates to a system for generating training image data for supervised machine learning for training a defect classifier to be applied to visual inspection, the system including:

a defect model storage to store defect models obtained by modeling shapes and optical characteristics of defects;

an inspection surface model storage to store inspection target surface models obtained by modeling shapes and optical characteristics of inspection target surfaces; and a hardware processor to:

arrange a defect model arbitrarily selected from the defect models stored on the defect model storage and an inspection target surface model arbitrarily selected from the inspection target surface models stored on the inspection target surface model storage, in any space in which ray tracing is performed by ray tracing simulation software in which an illumination optical system, an image pickup optical system, and an imaging sensor including a plurality of pixels are modeled;

trace a plurality of light rays and calculates illuminance at each of the pixels based on an intensity and a number of light rays entering the pixels; and generate pseudo image data as the training image data based on the calculated illuminance.

A second aspect of the present invention relates to a method for generating training image data for supervised machine learning for training a defect classifier to be applied to visual inspection, the method including:

arbitrarily selecting a defect model from defect models obtained by modeling shapes and optical characteristics of defects and stored on a defect model storage;

arbitrarily selecting an inspection target surface model from inspection target surface models obtained by modeling shapes and optical characteristics of inspection target surfaces and stored on an inspection target surface model storage; and arranging the selected defect model and the selected inspection target surface model in any space in which ray tracing is performed by ray tracing simulation software in which an illumination optical system, an image pickup optical system, and an imaging sensor including a plurality of pixels are modeled, tracing a plurality of light rays, calculating illuminance at each of the pixels based on an intensity and a number of light rays entering the pixels, and generating pseudo image data as the training image data based on the calculated illuminance.

A third aspect of the present invention relates to a non-transitory computer-readable recording medium storing a program for causing a computer to execute generating training image data for supervised machine learning for training a defect classifier to be applied to visual inspection, the program causing the computer to execute:

arbitrarily selecting a defect model from defect models obtained by modeling shapes and optical characteristics of defects and stored on a defect model storage;

arbitrarily selecting an inspection target surface model from inspection target surface models obtained by modeling shapes and optical characteristics of inspection target surfaces and stored on an inspection target surface model storage; and arranging the selected defect model and the selected inspection target surface model in any space in which ray tracing is performed by ray tracing simulation software in which an illumination optical system, an image pickup optical system, and an imaging sensor including a plurality of pixels are modeled, tracing a plurality of light rays, calculating illuminance at each of the pixels based on an intensity and a number of light rays entering the pixels, and generating pseudo image data as the training image data based on the calculated illuminance.

BRIEF DESCRIPTION OF THE DRAWINGS

The advantages and features provided by one or more embodiments of the present invention will become more fully understood from the detailed description given hereinbelow and the appended drawings which are given by way of illustration only, and thus are not intended as a definition of the limits of the present invention.

FIG. 1 is a block diagram illustrating a configuration of a training image data generation system according to an embodiment of the present invention.

FIG. 2A and FIG. 2B are diagrams for explaining an example of optical characteristics in a defect model.

DETAILED DESCRIPTION OF EMBODIMENTS

Figure 3A:
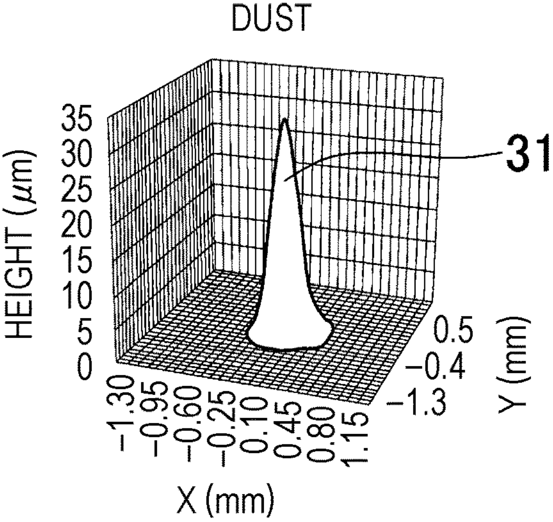
FIG. 3A to FIG. 3C are diagrams illustrating examples of a shape of a defect in a defect model.

Hereinafter, one or more embodiments of the present invention will be described with reference to the drawings. However, the scope of the invention is not limited to the disclosed embodiments.

Hereinafter, embodiments of the present invention will be described with reference to the drawings.

Figures 1, 2A, 2B:
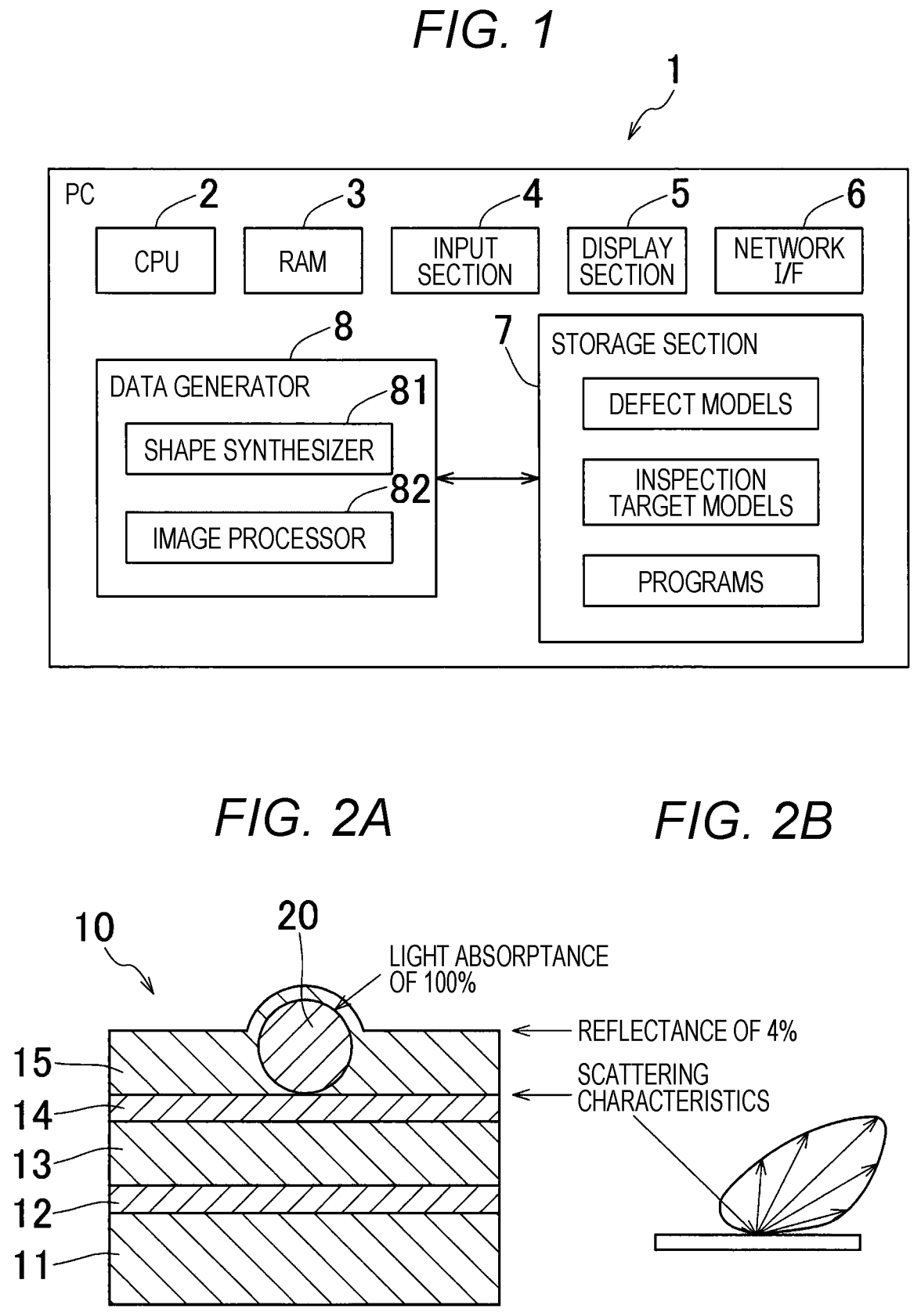

FIG. 1 is a configuration diagram of a training image data generation system 1 according to an embodiment of the present invention. In the present embodiment, a case of generating training image data for training a defect classifier to be applied to classify the type of a surface defect in visual inspection of a vehicle body will be described.

The training image data generation system 1 includes a personal computer (hereinafter, also referred to as a PC), and the PC includes, in terms of hardware, a central processing unit (CPU) 2, a random access memory (RAM) 3, an input section 4 such as a mouse or a keyboard, a display section 5 such as a liquid crystal display, a network interface (network I/F) 6 for communicating with an external device via a network, and a storage section 7 such as a hard disk or a solid state drive (SSD). The storage section 7 stores defect models, inspection target surface models, ray tracing simulation software, and other programs. These will be described later.

Meanwhile, the PC functionally includes a data generator 8. A function of the data generator 8 is implemented by the CPU 2 operating in accordance with a program stored in the storage section 7 and loaded into the RAM 3.

Each of the defect models stored in the storage section 7 is obtained by modeling a shape and an optical characteristic of a defect. Preferably, each of the defect models stored in the storage section 7 is given a label indicating a defect type of the defect model.

An example of the optical characteristics in the defect models is illustrated in FIG. 2A and FIG. 2B. As illustrated in FIG. 2A, characteristics illustrated in FIG. 2A and FIG. 2B are an example of optical characteristics of a coating defect generated when a primer layer 13, a base coat layer 14, and a clear layer 15 are sequentially formed by coating on a surface of a steel plate (coating surface) 11 in a vehicle body 10 via an electrodeposition layer 12 and a foreign matter is mixed into the clear layer 15. The light absorptance of the foreign matter 20 is set to 100%, the reflectance of the surface of the clear layer 15 is set to 4%, and scattering characteristics in the base coat layer 14 are set to characteristics illustrated in FIG. 2B. However, for the reflectance, the absorptance, and the scattering characteristics, it is desirable to provide characteristics that match an inspection target surface that is actually inspected.

Figure 3B:
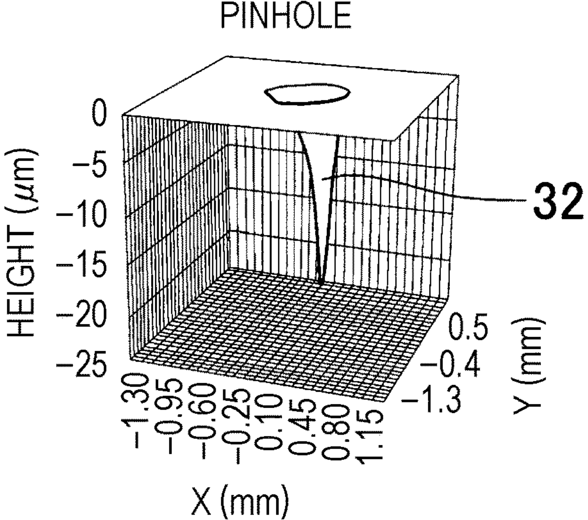
Figure 3C:
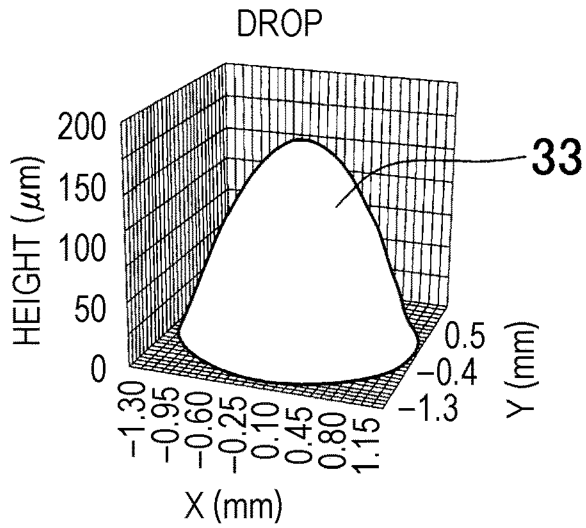

Examples of the shapes of the defects in the defect models are illustrated in FIG. 3A to FIG. 3C. Differences in defect type are mainly due to differences in defect shape.

A model illustrated in FIG. 3A is a model in which dust is mixed in a coating to form a conical surface protruding defect 31. A model illustrated in FIG. 3B is a model in which a pinhole is formed in a coating surface to form a conical surface recessed defect 32. A model illustrated in FIG. 3C is a model in which a drop of paint forms a surface protruding defect 33 having a semi-elliptical longitudinal cross section. The shape of each defect is held in an array of three-dimensional coordinates.

Each of the inspection target surface models stored in the storage section 7 is obtained by modeling a shape of an inspection target surface that is a surface of an object to be inspected and an optical characteristic of the inspection target surface.

Figures 4A, 4B, 4C, 4D:
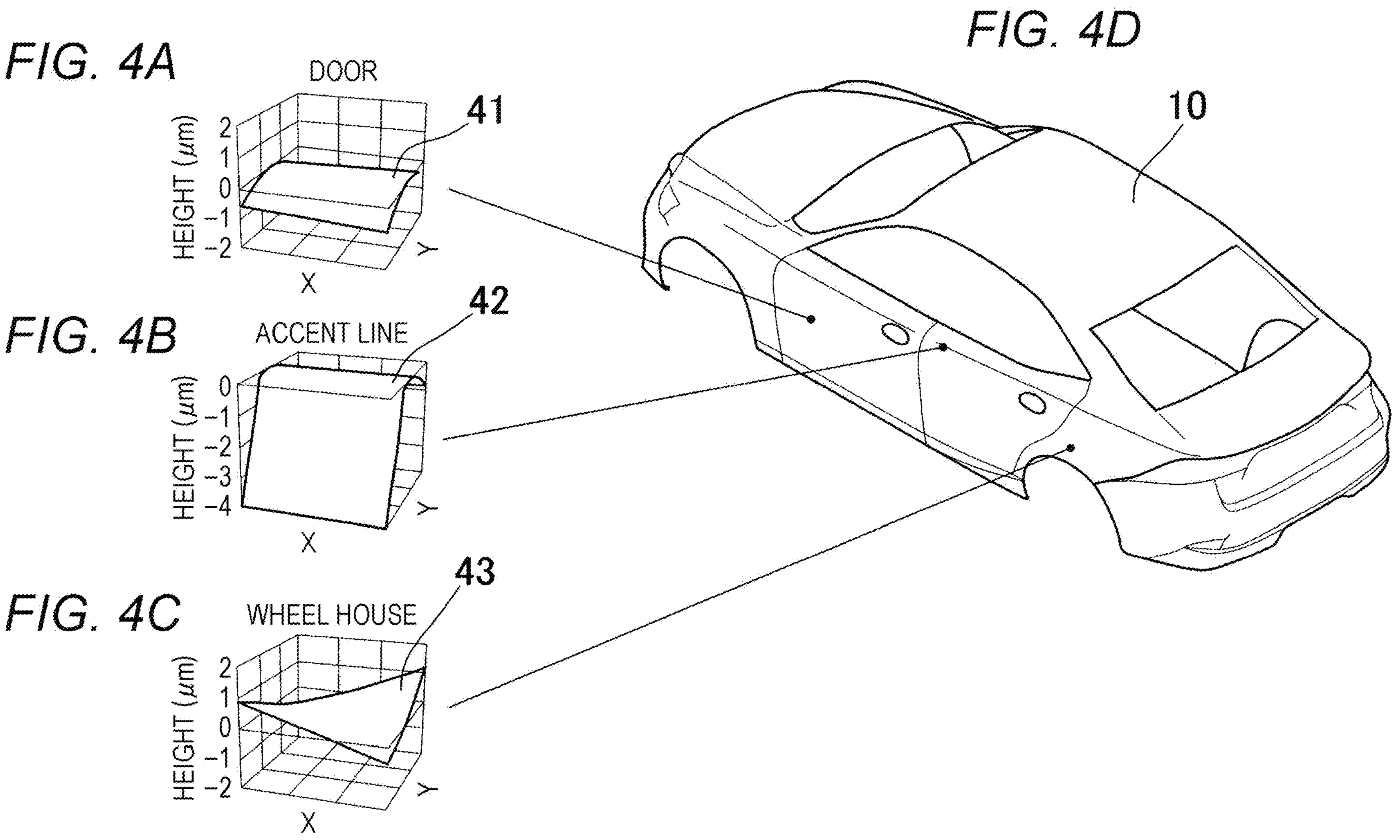
FIG. 4A to FIG. 4C are diagrams illustrating examples of a shape of an inspection target surface in an inspection target surface model.

Examples of the shapes of the inspection target surfaces in the inspection target surface models are illustrated in, for example, FIG. 4A to FIG. 4C. A model illustrated in FIG. 4A indicates a shape of an inspection target surface 41 of a part of a door of the vehicle body 10 illustrated in FIG. 4D, a model illustrated in FIG. 4B indicates a shape of an inspection target surface 42 of an accent line of a door of the vehicle body 10 illustrated in FIG. 4D, and a model illustrated in FIG. 4C indicates a shape of an inspection target surface 43 of a wheel house which is a wheel housing part of the vehicle body 10 illustrated in FIG. 4D. The shape of each of the inspection target surfaces 41 to 43 is held in an array of three-dimensional coordinates.

As illustrated in FIG. 2A, the optical characteristics of the inspection target surfaces 41 to 43 in the inspection target surface models are the reflection characteristics of the clear layer the scattering characteristics of the base coat layer 14, and the like in the inspection target surfaces 41 to 43. For the reflectance and the scattering characteristics, it is desirable to provide characteristics that match the inspection target surfaces to be actually inspected. In the present embodiment, the defect models and the inspection target surface models are stored in the single storage section 7 incorporated in the PC constituting the training image data generation system 1. However, the defect models and the inspection target surface models may be stored in different storage sections. Further, at least one of the defect models and the inspection target surface models may be stored in a storage section present outside the PC. When the defect models and the inspection target surface models are stored in a storage section present outside the PC, the PC acquires any defect model and any inspection target surface model from the external storage section.

The data generator 8 generates training image data and includes a shape synthesizer 81 and an image processor 82. The shape synthesizer 81 synthesizes a shape of a defect model and a shape of an inspection target surface model. The image processor 82 performs image processing on the generated training image data.

A specific method for generating the training image data by the data generator 8 is as follows.

That is, a defect model stored in the storage section 7 is arbitrarily selected. An inspection target surface model stored in the storage section 7 is arbitrarily selected. Then, the selected defect model and the selected inspection target surface model are arranged in any space in which ray tracing is performed by the ray tracing simulation software. In the ray tracing simulation software, a lighting optical system 50, an imaging optical system 60, and an imaging sensor 63 including a plurality of pixels are modeled.

Figure 5A:
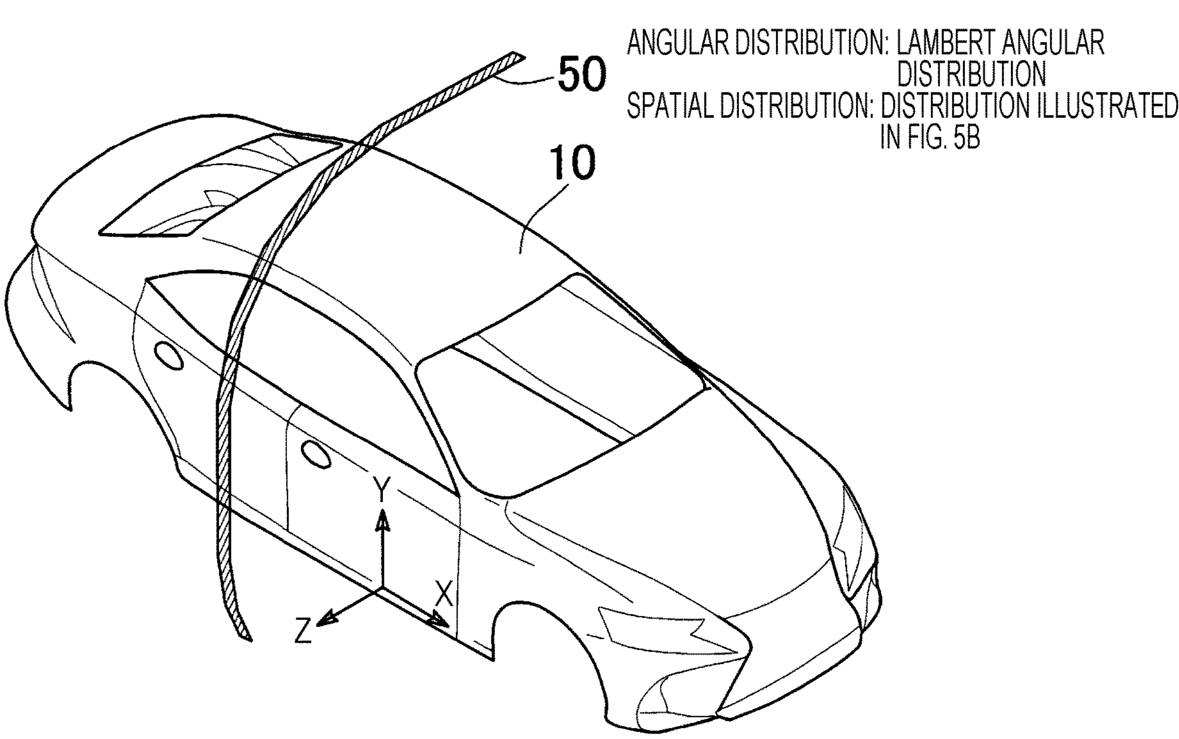
FIG. 5A and FIG. 5B are diagrams for explaining modeling of a lighting optical system.
Figure 5B:
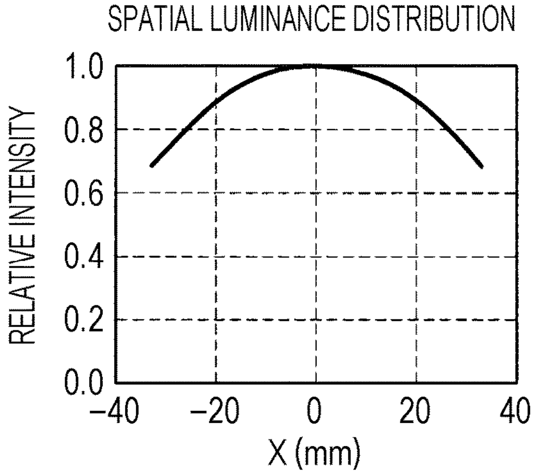

The modeling of the lighting optical system 50 is implemented by, for example, a model as illustrated in FIG. 5A and FIG. 5B. In the example illustrated in FIG. 5A and FIG. 5B, the lighting optical system 50 including strip-shaped lighting is disposed so as to surround the vehicle body 10 in the width direction, an angular distribution of the lighting optical system 50 is set to a Lambert angular distribution, and a spatial distribution of the lighting optical system 50 is set to a distribution illustrated in FIG. 5B. In FIG. 5B, the horizontal axis indicates the width of the lighting optical system 50. However, it is desirable to generate a model that matches a spatial luminance distribution and an orientation distribution of a light source mounted in an inspection apparatus in which the classifier is to be installed.

Figure 6:
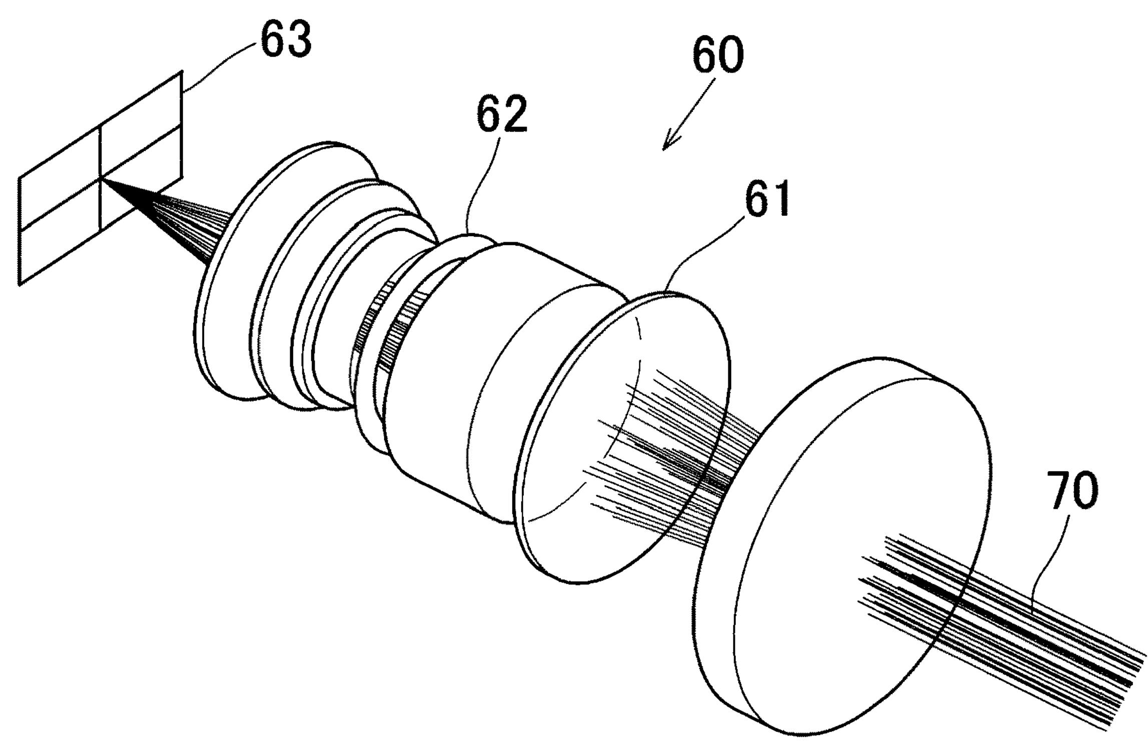
FIG. 6 is a diagram for explaining modeling of an imaging optical system.

The modeling of the imaging optical system 60 is implemented by, for example, a model as illustrated in FIG. 6. In the example illustrated in FIG. 6, light 70 reflected from the inspection target surfaces 41 to 43 is focused onto the imaging sensor 63 through a lens 61 and a diaphragm 62. In order to reproduce, on an image, optical aberration and a reduction in the amount of ambient light, which actually occur, it is desirable to perform the modeling in accordance with a lens or the like mounted on the inspection apparatus in which the classifier is to be installed.

To arrange the defect model and the inspection target surface model in any space, the shape of the defect and the shape of the inspection target surface are synthesized by the shape synthesizer 81. The shapes may be synthesized by any one of the following methods (1) to (3).

(1) Each of the shape of the defect model and the shape of the inspection target surface model is held in a three-dimensional coordinate array, and the shapes are synthesized by summing the z values of points having the same (x, y).

(2) Each of the shape of the defect model and the shape of the inspection target surface model are held in a two-dimensional matrix in which values indicate the heights, and the shapes are synthesized by summing the same matrix elements.

(3) Each of the shape of the defect model and the shape of the inspection target surface model are held in any form (for example, the above-described three-dimensional coordinate array, the above-described two-dimensional matrix, or a polygon), and the shapes are synthesized by a Boolean operation.

The ray tracing simulation software is capable of geometrically optically simulating how a light ray is transmitted, refracted, and reflected to propagate, and for example, known software such as "LightTools" of Synopsys, Inc may be used. "LightTools" is a product name.

Figure 7:
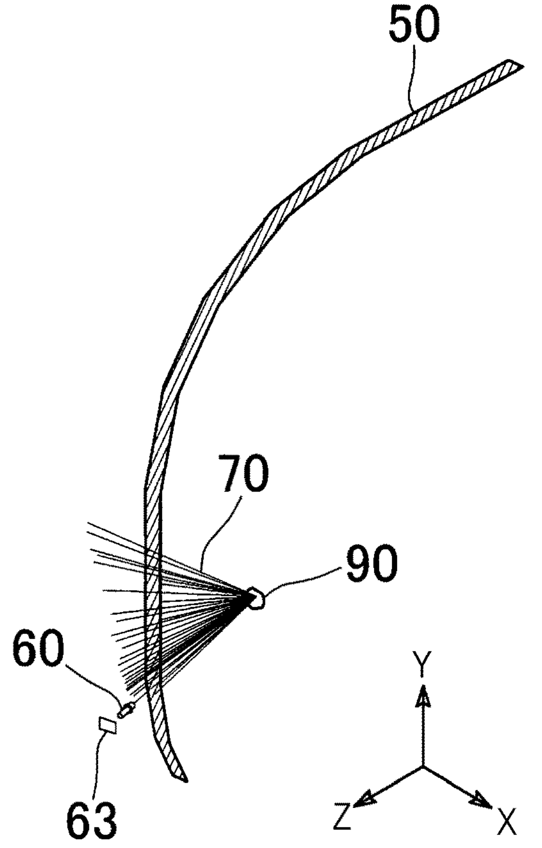
FIG. 7 is a diagram illustrating an example of arrangement of elements of a defect model and an inspection target surface model, a lighting optical system including lighting, an imaging optical system, and an imaging sensor in a ray tracing simulation.

FIG. 7 illustrates an example of arrangement of elements of a model 90 obtained by synthesizing the defect model and the inspection target surface model, the lighting optical system 50, the imaging optical system 60, and the imaging sensor 63 in a ray tracing simulation.

In a state where the elements are arranged as described above, illuminance in each of the pixels is calculated based on an intensity and the number of light rays reflected from the inspection target surface and incident on the pixels of the imaging sensor 63. Then, pseudo image data is generated based on the calculated illuminance and is used as training image data.

The generated pseudo image data is output to and stored in the storage section 7 in the training image data generation system, or a storage section provided outside the system in a general image format (for example, Bitmap, TIFF, or the like). When a label indicating a defect type is given to the defect model, it is desirable that the same label as the defect type of the used defect model be given to the generated pseudo image data and the generated pseudo image data be stored from the viewpoint of easy management of the generated pseudo image data.

Figure 8A:
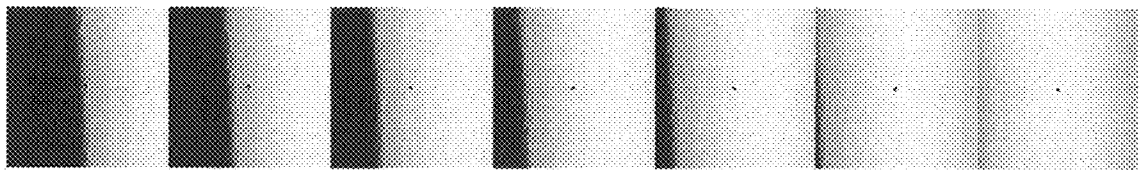
FIG. 8A is a diagram illustrating pseudo image data when a defect model and an inspection target surface model as a surface defect due to dust in the vicinity of a door of a vehicle body are moved by a minute amount.
Figure 8B:
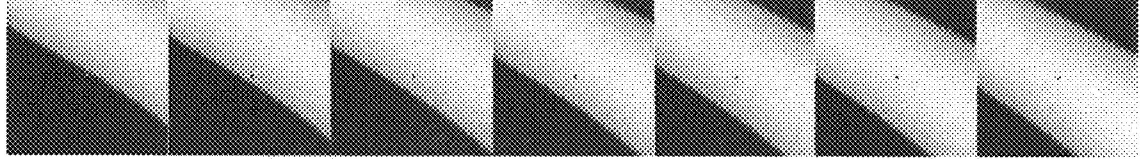
FIG. 8B is a diagram illustrating pseudo image data when a defect model and an inspection target surface model as a surface defect due to a pinhole in the vicinity of a wheelhouse of the vehicle body are moved by a minute amount.
Figure 8C:
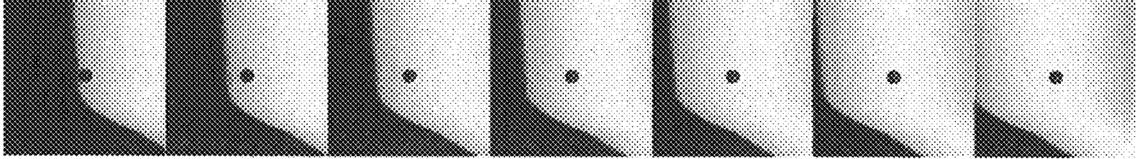
FIG. 8C is a diagram illustrating pseudo image data when a defect model and an inspection target surface model as a surface defect due to a drop of paint in the vicinity of an accent line of the vehicle body are moved by a minute amount.

FIG. 8A to FIG. 8C illustrate examples of the generated pseudo image data. In the visual inspection of the vehicle body, imaging is continuously performed by an imaging device while moving at least one of the vehicle body or a lighting device. For this reason, the pseudo image data illustrated in FIG. 8A to FIG. 8C is also generated while the model 90 obtained by synthesizing the defect model and the inspection target surface model is moved by a minute amount and arranged at a plurality of different positions.

Specifically, FIG. 8A illustrates the pseudo image data when the model 90 obtained by synthesizing the inspection target surface model and the defect model as a surface defect due to dust in the vicinity of the door of the vehicle body 10 is moved by a minute amount. FIG. 8B illustrates the pseudo image data when the model 90 obtained by synthesizing the inspection target surface model and the defect model as a surface defect due to a pinhole in the vicinity of the wheelhouse of the vehicle body 10 is moved by a minute amount. FIG. 8C illustrates pseudo image data when the model 90 obtained by synthesizing the inspection target surface model and the defect model as a surface defect due to a drop of paint in the vicinity of the accent line of the vehicle body 10 is moved by a minute amount. In each of the cases, a black dot portion in a bright zone indicates a defect.

In the captured image data of the actual surface defect, the luminance may slightly change, or noise may occur in the image depending on the type of the surface defect, the imaging conditions, or the like. Therefore, in order to match the generated pseudo image data with the actual captured image data, image processing for changing luminance and/or adding noise may be performed on the generated pseudo image data by the image processor 82.

An example of a workflow of classifier installation using the training image data generation system 1 according to the present embodiment will be described below.

[1] Information of defects generated in a mass production site is acquired in advance by using a three-dimensional shape measurement device or the like, and a plurality of defect models are prepared. An example of the three-dimensional shape measurement device that can be used on site is GelSight Mobile manufactured by GelSight, Inc. In addition, a variation distribution of shapes and characteristics may be predicted from the plurality of defect models, and the number of defect models may be increased using random numbers.

[2] Information of a workpiece to be inspected by the inspection apparatus in which the classifier is installed is acquired, and a plurality of inspection target surface models are prepared. For example, in the case of a coating defect inspection apparatus for a vehicle body, computer-aided design (CAD) data can be provided in advance by a user of the inspection apparatus, and a surface of the CAD data can be cut out for each measurement range to generate a distribution of shapes of inspection target surfaces.

[3] The lighting optical system 50, the imaging optical system 60, and the imaging sensor 63 of the inspection apparatus are arranged on the ray tracing simulation software.

[4] The defect model and the inspection target surface model are arbitrarily synthesized, and the synthesized model 90 is arranged on the ray tracing simulation software. In a case where the defect model and the inspection target surface model are synthesized, the synthesizing may be performed in accordance with a predetermined probability distribution corresponding to the actual occurrence frequency. For example, in the case of a vehicle body coating defect, it is conceivable to control the probability of a synthesis with an inspection target surface model for each of the type of defect that is likely to occur on a vehicle body side surface and the type of defect that is likely to occur on a vehicle body upper surface.

[5] Ray tracing is performed by the ray tracing simulation software, and the luminance value of each pixel is calculated using the intensity and number of light rays that have reached each pixel of the imaging sensor 63, converted into an image format, and output to and stored in the storage section 7 of the PC or an external storage section.

[6] The model 90 obtained by synthesizing the defect model and the inspection target surface shape model is moved by a minute amount, ray tracing is performed again, and an image file is output. The minute amount is determined in accordance with an imaging frame rate in the actual inspection apparatus and moving speeds of an inspection target object and an image sensing section. The ray tracing for this movement is repeated a predetermined number of times to generate an image set in which a plurality of images are set.

[7] Through the above processes, a plurality of image sets (usually, several hundred or more image sets) are generated for each defect type to be classified, and a learning model for supervised machine learning is trained. In this case, it is desirable to classify the image sets into an image set for training and an image set for evaluation and check classification performance using the image set for evaluation before installing the learning model in the inspection apparatus.

As described above, according to the training image data generation system 1 according to the present embodiment, a defect model is arbitrarily selected from the storage section 7 that holds defect models obtained by modeling shapes and optical characteristics of defects. In addition, an inspection target surface model is arbitrarily selected from the storage section 7 that holds inspection target surface models obtained by modeling shapes and optical characteristics of inspection target surfaces. The selected defect model and the selected inspection target surface model are arranged in any space in which ray tracing is performed by the ray tracing simulation software in which the lighting optical system, the imaging optical system 60, and the imaging sensor 63 including the plurality of pixels are modeled. Then, a plurality of light rays are traced, and illuminance in each of the pixels is calculated based on an intensity and the number of light rays incident on the pixels of the imaging sensor 63. Based on the calculated illuminance, pseudo image data is generated as training image data. That is, since a defect model is generated by modeling a defect and training image data is generated by ray tracing, all the generated training image data is appropriate image data corresponding to the defect model, and it is not necessary to give a correct label. Therefore, appropriate training image data can be easily generated, and the cost of generating training data can be reduced.

Furthermore, since a synthesis of a defect shape and other characteristics (for example, a shape of an inspection target surface, optical characteristics of the inspection target surface, lighting conditions, imaging conditions, and the like) can be freely modeled, a sufficient amount of training data can be easily obtained even for a small defect that occurs at a low rate.

Although one or more embodiments of the present invention have been described and illustrated in detail, the disclosed embodiments are made for purposes of illustration and example only and not limitation. The scope of the present invention should be interpreted by terms of the appended claims.

What is claimed is:

1. A system for generating training image data for supervised machine learning for training defect classifier to be applied to visual inspection, the system comprising:

a defect model storage to store defect models obtained by modeling shapes and optical characteristics of defects;

an inspection target surface model storage to store inspection target surface models obtained by modeling shapes and optical characteristics of inspection target surfaces; and a hardware processor to:

arrange a defect model arbitrarily selected from the defect models stored on the defect model storage and an inspection target surface model arbitrarily selected from the inspection target surface models stored on the inspection target surface model storage, in any space in which ray tracing is performed by ray tracing simulation software in which an illumination optical system, an image pickup optical system, and an imaging sensor including a plurality of pixels are modeled;

trace a plurality of light rays, and calculate illuminance at each of the pixels based on an intensity and a number of light rays entering the pixels; and generate pseudo image data as the training image data based on the calculated illuminance, wherein the illumination optical system includes strip-shaped lighting disposed so as to surround a vehicle body in a width direction, the processor is further configured to generate the pseudo image data while at least one of an illumination optical system model or a model obtained by synthesizing the defect model and the inspection target surface model is moved by a minute amount and arranged at a plurality of different positions, and wherein the inspection target surfaces are coated surfaces in which a clear layer is formed on a base coat layer, and an optical characteristic of the inspection target surface model includes a scattering characteristic of the base coat layer and a reflection characteristic of the clear layer.

2. The system for generating training image data for supervised machine learning according to claim 1, wherein each of the defect models stored on the defect model storage is given a label indicating a defect type of each defect model, and the pseudo image data generated by the hardware processor is given the same label as the label given to the defect model used in the generation of the pseudo image data.

3. The system for generating training image data for supervised machine learning according to claim 1, wherein the hardware processor arranges the defect model and the inspection target surface model at a plurality of different positions on the ray tracing simulation software and generates the pseudo image data.

4. The system for generating training image data for supervised machine learning according to claim 1, wherein the hardware processor has a function of either or both changing lightness and adding noise by performing image processing on the pseudo image data generated by the optical simulation.

5. The system for generating training image data for supervised machine learning according to claim 1, wherein the hardware processor creates a combined shape of the defect model and the inspection target surface model and places the combined shape of the defect model and the inspection target surface model in any space in which ray tracing is performed by the ray tracing simulation software.

6. The system for generating training image data for supervised machine learning according to claim 1, wherein the defect models are models of a coating defect in which a foreign matter is mixed into the clear layer.

7. A method for generating training image data for supervised machine learning for training a defect classifier to be applied to visual inspection, the method comprising:

arbitrarily selecting a defect model from defect models obtained by modeling shapes and optical characteristics of defects and stored on a defect model storage;

arbitrarily selecting an inspection target surface model from inspection target surface models obtained by modeling shapes and optical characteristics of inspection target surfaces and stored on an inspection target surface model storage; and arranging the selected defect model and the selected inspection target surface model in any space in which ray tracing is performed by ray tracing simulation software in which an illumination optical system, an image pickup optical system, and an imaging sensor including a plurality of pixels are modeled, tracing a plurality of light rays, calculating illuminance at each of the pixels based on an intensity and a number of light rays entering the pixels, and generating pseudo image data as the training image data based on the calculated illuminance, generating the pseudo image data while at least one of an illumination optical system model or a model obtained by synthesizing the defect model and the inspection target surface model is moved by a minute amount and arranged at a plurality of different positions, wherein the illumination optical system includes strip-shaped lighting disposed so as to surround a vehicle body in a width direction, and wherein the inspection target surfaces are coated surfaces in which a clear layer is formed on a base coat layer, and an optical characteristic of the inspection target surface model includes a scattering characteristic of the base coat layer and a reflection characteristic of the clear layer.

8. The method for generating training image data for supervised machine learning according to claim 7, wherein each of the defect models stored on the defect model storage is given a label indicating a defect type of each defect model, and the generated pseudo image data is given the same label as the label given to the defect model used in the generation of the pseudo image data.

9. The method for generating training image data for supervised machine learning according to claim 7, wherein the defect model and the inspection target surface model are arranged at a plurality of different positions on the ray tracing simulation software, and the pseudo image data is generated.

10. The method for generating training image data for supervised machine learning according to claim 7, wherein either or both changing lightness and adding noise are achieved by performing image processing on the pseudo image data generated by the optical simulation.

11. The method for generating training image data for supervised machine learning according to claim 7, wherein a combined shape of the defect model and the inspection target surface model is created, and the combined shape of the defect model and the inspection target surface model is placed in any space in which ray tracing is performed by the ray tracing simulation software.

12. The method for generating training image data for supervised machine learning according to claim 7, wherein the defect models are models of a coating defect in which a foreign matter is mixed into the clear layer.

13. A non-transitory computer-readable recording medium storing a program for causing a computer to execute generating training image data for supervised machine learning for training a defect classifier to be applied to visual inspection, the program causing the computer to execute:

arbitrarily selecting a defect model from defect models obtained by modeling shapes and optical characteristics of defects and stored on a defect model storage;

arbitrarily selecting an inspection target surface model from inspection target surface models obtained by modeling shapes and optical characteristics of inspection target surfaces and stored on an inspection target surface model storage;

arranging the selected defect model and the selected inspection target surface model in any space in which ray tracing is performed by ray tracing simulation software in which an illumination optical system, an image pickup optical system, and an imaging sensor including a plurality of pixels are modeled, tracing a plurality of light rays, calculating illuminance at each of the pixels based on an intensity and a number of light rays entering the pixels, and generating pseudo image data as the training image data based on the calculated illuminance, and generating the pseudo image data while at least one of an illumination optical system model or a model obtained by synthesizing the defect model and the inspection target surface model is moved by a minute amount and arranged at a plurality of different positions, wherein the illumination optical system includes strip-shaped lighting disposed so as to surround a vehicle body in a width direction, and wherein the inspection target surfaces are coated surfaces in which a clear layer is formed on a base coat layer, and an optical characteristic of the inspection target surface model includes a scattering characteristic of the base coat layer and a reflection characteristic of the clear layer.

14. The non-transitory computer-readable recording medium according to claim 13, wherein each of the defect models stored on the defect model storage is given a label indicating a defect type of each defect model, and the program causes the computer to execute giving the generated pseudo image data the same label as the label given to the defect model used in the generation of the pseudo image data.

15. The non-transitory computer-readable recording medium according to claim 13, wherein the program causes the computer to execute arranging the defect model and the inspection target surface model at a plurality of different positions on the ray tracing simulation software and generating the pseudo image data.

16. The non-transitory computer-readable recording medium according to claim 13, wherein the program causes the computer to execute either or both changing lightness and adding noise by performing image processing on the pseudo image data generated by the optical simulation.

17. The non-transitory computer-readable recording medium according to claim 13, wherein the program causes the computer to execute creating a combined shape of the defect model and the inspection target surface model and placing the combined shape of the defect model and the inspection target surface model in any space in which ray tracing is performed by the ray tracing simulation software.

18. The non-transitory computer-readable recording medium according to claim 13, wherein the defect models are models of a coating defect in which a foreign matter is mixed into the clear layer.

* * * * *